(12) United States Patent
Pond et al.

(10) Patent No.: US 9,836,709 B1
(45) Date of Patent: Dec. 5, 2017

(54) SYSTEM, METHOD, AND COMPUTER PROGRAM FOR GENERATING A VISIBILITY MODEL FOR A PROJECT

(71) Applicant: Amdocs Software Systems Limited, Dublin (IE)

(72) Inventors: Mark Jeremy Pond, St. Albans (GB); Matthieu Nicolas Lepaigneul, Pleugueneuc (FR); Luke James Parker, Ocean Grove (AU); Gil Leibovich, Kfar-Saba (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 595 days.

(21) Appl. No.: 14/263,905

(22) Filed: Apr. 28, 2014

(51) Int. Cl.
*G06Q 10/00* (2012.01)
*G06Q 10/06* (2012.01)

(52) U.S. Cl.
CPC ... *G06Q 10/063114* (2013.01); *G06Q 10/067* (2013.01); *G06Q 10/06313* (2013.01)

(58) Field of Classification Search
CPC .............................................. G06Q 10/06313
USPC ....................................................... 705/7.23
See application file for complete search history.

(56) References Cited

U.S. PATENT DOCUMENTS

| 2007/0150327 | A1* | 6/2007 | Dromgold | G06F 17/30551 705/7.17 |
|---|---|---|---|---|
| 2008/0046275 | A1* | 2/2008 | Simons | G06Q 10/06 705/7.23 |
| 2012/0116834 | A1* | 5/2012 | Pope | G06Q 10/06316 705/7.26 |
| 2013/0030851 | A1* | 1/2013 | Rahmouni | G06Q 10/00 705/7.11 |
| 2014/0278703 | A1* | 9/2014 | Owens, Jr. | G06Q 10/06313 705/7.23 |
| 2015/0073845 | A1* | 3/2015 | Bassiri | G06Q 50/08 705/7.12 |

* cited by examiner

*Primary Examiner* — Sujay Koneru
(74) *Attorney, Agent, or Firm* — Zilka-Kotab, PC

(57) ABSTRACT

A system, method, and computer program product are provided for generating a visibility model for a project. In use, a plurality of systems associated with at least one project are identified. Additionally, information associated with the at least one project is received from the plurality of systems, the information including information corresponding to discrete activities associated with the at least one project and the information being received by a visibility model generation system that is separate from the plurality of systems. Further, the received information corresponding to the discrete activities is organized into common groups of work. In addition, at least one visibility model associated with the at least one project is generated utilizing the information corresponding to the discrete activities organized into common groups of work. Furthermore, updated information associated with the at least one project is received from at least one of the plurality of systems, the updated information including information corresponding to a project progress associated with the at least one of the plurality of systems. Still yet, at least a portion of the at least one visibility model associated with the at least one project is updated utilizing the updated information.

6 Claims, 10 Drawing Sheets

US 9,836,709 B1

SYSTEM, METHOD, AND COMPUTER PROGRAM FOR GENERATING A VISIBILITY MODEL FOR A PROJECT

FIELD OF THE INVENTION

The present invention relates to project execution, and more particularly to generating visibility models for such projects.

BACKGROUND

Communication Service Providers (CSPs) have spent years refining best practices around rolling out networks. Traditionally, network rollout projects require a lot of experienced staff and multiple manual hand-offs between various people and systems.

In this type of environment, providing visibility of a current state of any group or individual project is a very manual and cumbersome task. New technologies such as Small Cells provide new challenges of scale, as operators need to significantly increase the amount of projects they run within a given period. This makes the task of providing project visibility even more cumbersome and error prone.

There is thus a need for addressing these and/or other issues associated with the prior art.

SUMMARY

A system, method, and computer program product are provided for generating a visibility model for a project. In use, a plurality of systems associated with at least one project are identified. Additionally, information associated with the at least one project is received from the plurality of systems, the information including information corresponding to discrete activities associated with the at least one project and the information being received by a visibility model generation system that is separate from the plurality of systems. Further, the received information corresponding to the discrete activities is organized into common groups of work. In addition, at least one visibility model associated with the at least one project is generated utilizing the information corresponding to the discrete activities organized into common groups of work. Furthermore, updated information associated with the at least one project is received from at least one of the plurality of systems, the updated information including information corresponding to a project progress associated with the at least one of the plurality of systems. Still yet, at least a portion of the at least one visibility model associated with the at least one project is updated utilizing the updated information.

DETAILED DESCRIPTION

Figure 1:
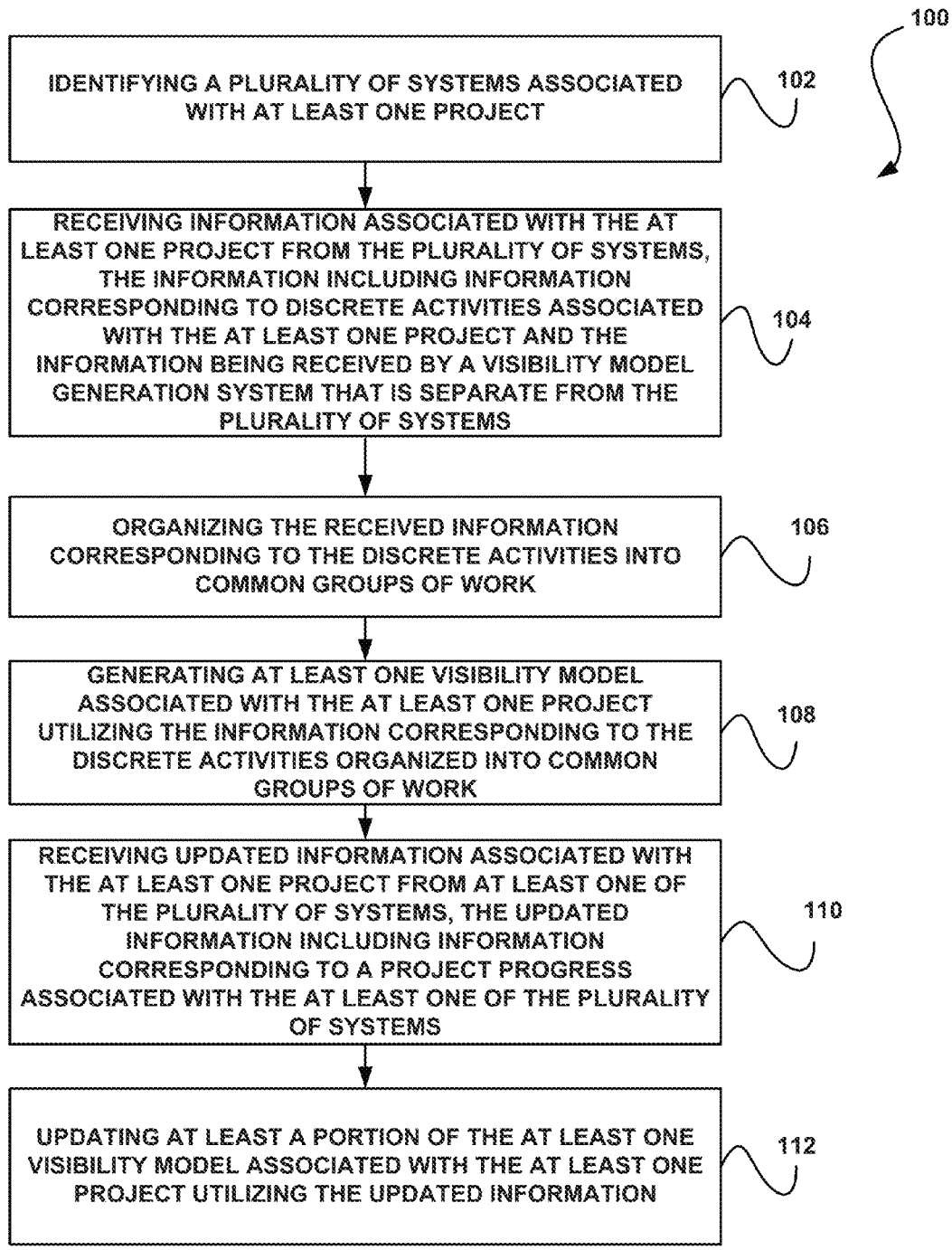
FIG. 1 illustrates a method for generating a visibility model for a project, in accordance with one embodiment.

FIG. 1 illustrates a method 100 for generating a visibility model for a project, in accordance with one embodiment.

As shown, a plurality of systems associated with at least one project are identified. See operation 102. The project may include any type of project that utilizes a project plan or model. For example, in one embodiment, the project may include a network rollout project.

Furthermore, the project may be associated with any number of industries. For example, in one embodiment, the project may be associated with a communication service provider (CSP).

The systems may include any type of system associated with the project. For example, the systems may include any system that contributes to the progress and/or execution of the project.

Additionally, information associated with the at least one project is received from the plurality of systems. The information includes information corresponding to discrete activities associated with the at least one project. Furthermore, the information is received by a visibility model generation system that is separate from the plurality of systems. See operation 104.

The visibility model generation system may include any software and/or hardware capable of functioning to generate a visibility model generation. For example, in one embodiment, the visibility model generation system may include a service level management module. Furthermore, the activities may include any activities associated with the project.

The received information corresponding to the discrete activities is organized into common groups of work and/or project stages. See operation 106. For example, discrete activities from various different systems (or the same system) may be organized into common groups of work and/or project stages based on the activity type, etc.

In addition, at least one visibility model associated with the at least one project is generated utilizing the information corresponding to the discrete activities organized into common groups of work. See operation 108.

Furthermore, updated information associated with the at least one project is received from at least one of the plurality of systems, the updated information including information corresponding to a project progress associated with the at least one of the plurality of systems. See operation 110.

Still yet, at least a portion of the at least one visibility model associated with the at least one project is updated utilizing the updated information. See operation 112. Thus, the visibility model of the project may be generated and updated utilizing project information from various disparate systems. Moreover, in this manner, the visibility of the project may be separated from the many systems that play a part in a project's progress and/or execution.

In various embodiments, the visibility model may be capable of being accessed utilizing one or more web services. Further, in one embodiment, generating the visibility model associated with the project may include generating a project plan including a plurality of sub-plans. In this case, updating the visibility model may include updating one or more of the sub-plans. In another case, updating the visibility model may include adding additional sub-plans to the project plan.

Additionally, the project plan may include one or more parent plan nodes each representing a stage of the at least one project, and at least one of the parent plan nodes may include one or more child plan nodes each representing a sub-stage of the stage. In this case, the child plan nodes may include one or more grandchild nodes representing information associated with the sub-stage.

This visibility model may include any model, diagram, schematic, and/or other layout associated with the project. For example, the visibility model may show a project plan associated with the project.

Additionally, in one embodiment, generating the visibility model may include generating a plan view including activity information associated with the project. In one embodiment, the plan view may include a view of the entire project plan associated with the project. Furthermore, in various embodiments, the plan view may be zoom-able, scrollable, and searchable.

In one embodiment, the plan view may include information associated with a plurality of plans in a single view. In this case, the plan view may be configured to be zoom-able, scrollable, or searchable such that the plan view displays information associated with a single plan of the plurality of plans. In another case, the plan view may be configured to be zoom-able, scrollable, or searchable such that the plan view displays information associated with a parent plan and a plurality of sub-plans.

In another embodiment, generating the visibility model may include generating a milestone view associated with the project. The milestone view may include the plan view with a timeline of key points associated with the project.

In another embodiment, generating the visibility model may include generating a summary view associated with the project. In this case, the summary view may include information associated with at least one stage corresponding to the project and a timeline associated with the project.

In one embodiment, the summary view may include information about all stages associated with the project. In this case, the information about the stages associated with the project may include an indication of project stages that have yet to be started, project stages that have been started, and project stages that have been completed.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
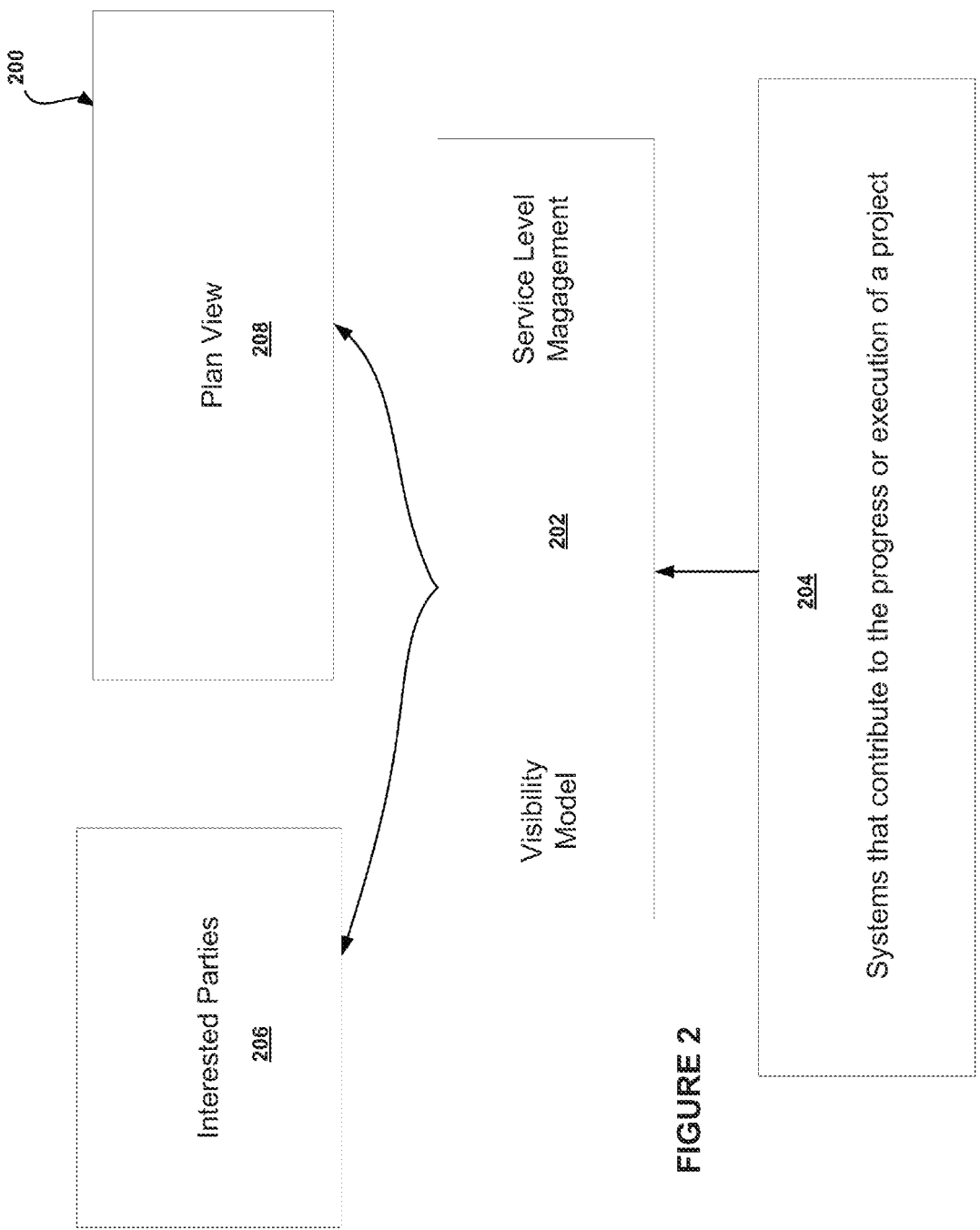
FIG. 2 illustrates a functional diagram of a system for generating a visibility model for a project, in accordance with one embodiment.

FIG. 2 illustrates a functional diagram of a system 200 for generating a visibility model for a project, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, a visibility model generation system 202 receives information that is separate from a plurality of systems 204 that contribute to a progress or execution of a project. The visibility model generation system 202 generates a visibility model associated with the project and provides various views 208 of the project and/or provides information to interested parties 206 (e.g. third party vendors, etc.).

Network rollout projects have many inter-dependencies within the project and externally with third party vendors. A plan is generated to run on time, but the complexity of projects that have multiple dispersed teams involved, various delays, supplements, rework, and various systems that are involved in the project execution and completion often cause delays. In order to provide visibility of progress and adherence to any service level agreements within this environment, the system 200 functions to provide a separation of the visibility from the execution.

In one embodiment, the visibility model may be accessed through a set of web services and may provide a way to register a plan made up of discrete activities organized into common groups of work and/or stages. The activities may be related to each other in this model allowing arbitrary dependencies to be modeled.

Figure 3:
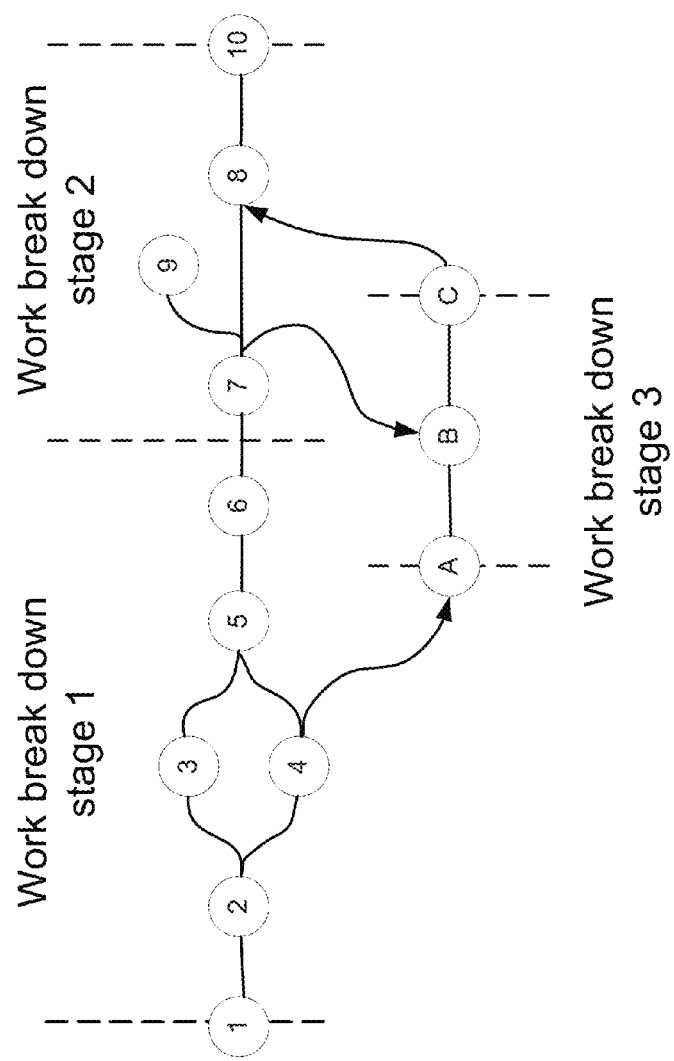
FIG. 3 illustrates an example showing various work stages associated with a project, in accordance with one embodiment.

FIG. 3 illustrates an example 300 showing various work stages associated with a project, in accordance with one embodiment. As an option, the example 300 may be viewed in the context of the details of the previous figures. Of course, however, the example 300 may be viewed in the context of any desired environment. Further, the aforementioned definitions may equally apply to the description below.

As shown, various work activities may be broken down into various stages. As the plan executes, the systems involved provide updates of individual activity status (e.g. through web services, etc.). In one embodiment, a service level management module (e.g. associated with the visibility model generation system 202, etc.) may act on the start and completion statuses of the activity and monitor the actual duration against the expected duration. As an option, the service level management module may be configured with escalation thresholds which when triggered may be placed back into the visibility model to be used by various clients.

Rework in network rollout projects plays a key part as mistakes can easily occur due to the high number of people involved in a project. The visibility model allows activity statuses to be set to indicate that they are being re-executed any number of times. At the same time, the service level management module may reset its monitoring so that escalations on the rework may be achieved.

Network rollout projects often have to deal with change and adapt to the changing conditions within the project. In order to support these needs, the visibility model may function to provide a mechanism to adjust the plan by registering sub-plans at any point in the flow.

Figure 4:
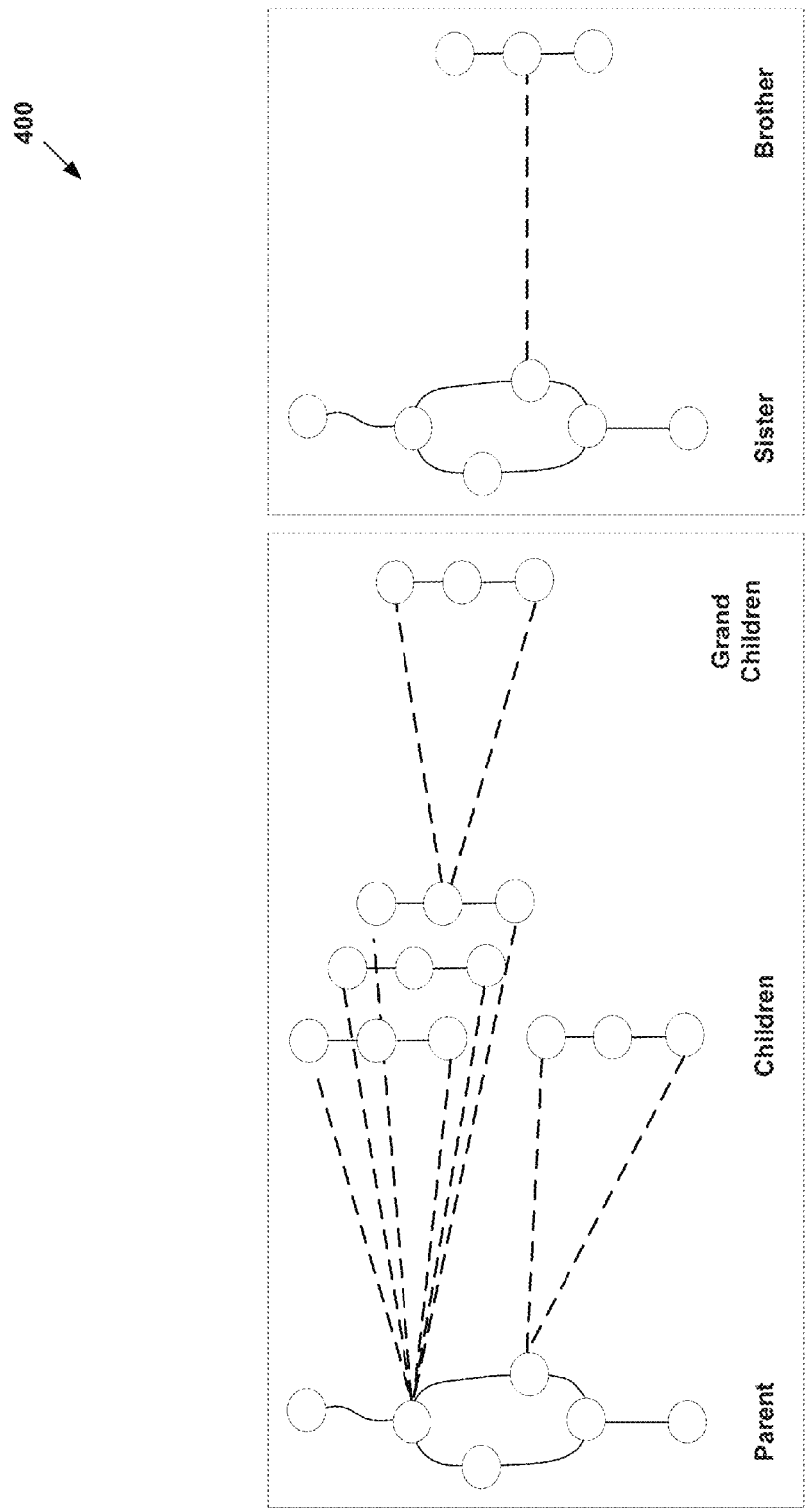
FIG. 4 illustrates an example showing various plan/subplan relationships associated with a project, in accordance with one embodiment.

FIG. 4 illustrates an example 400 showing various plan/sub-plan relationships associated with a project, in accordance with one embodiment. As an option, the example 400 may be viewed in the context of the details of the previous figures. Of course, however, the example 400 may be viewed in the context of any desired environment. Further, the aforementioned definitions may equally apply to the description below.

As shown, a project plan may include various sub-plans including activities representing children and grandchildren, etc. These sub-plans may be registered at any point in the flow of a project.

This enables a plan to evolve and adapt across systems within a project but for their still to be one view of visibility provided by the model and presented via a plan view. The plan view can come in many different presentation styles. One example of this is in the form of an adapted sub-way diagram showing the graph of nodes and their status.

Figure 5:
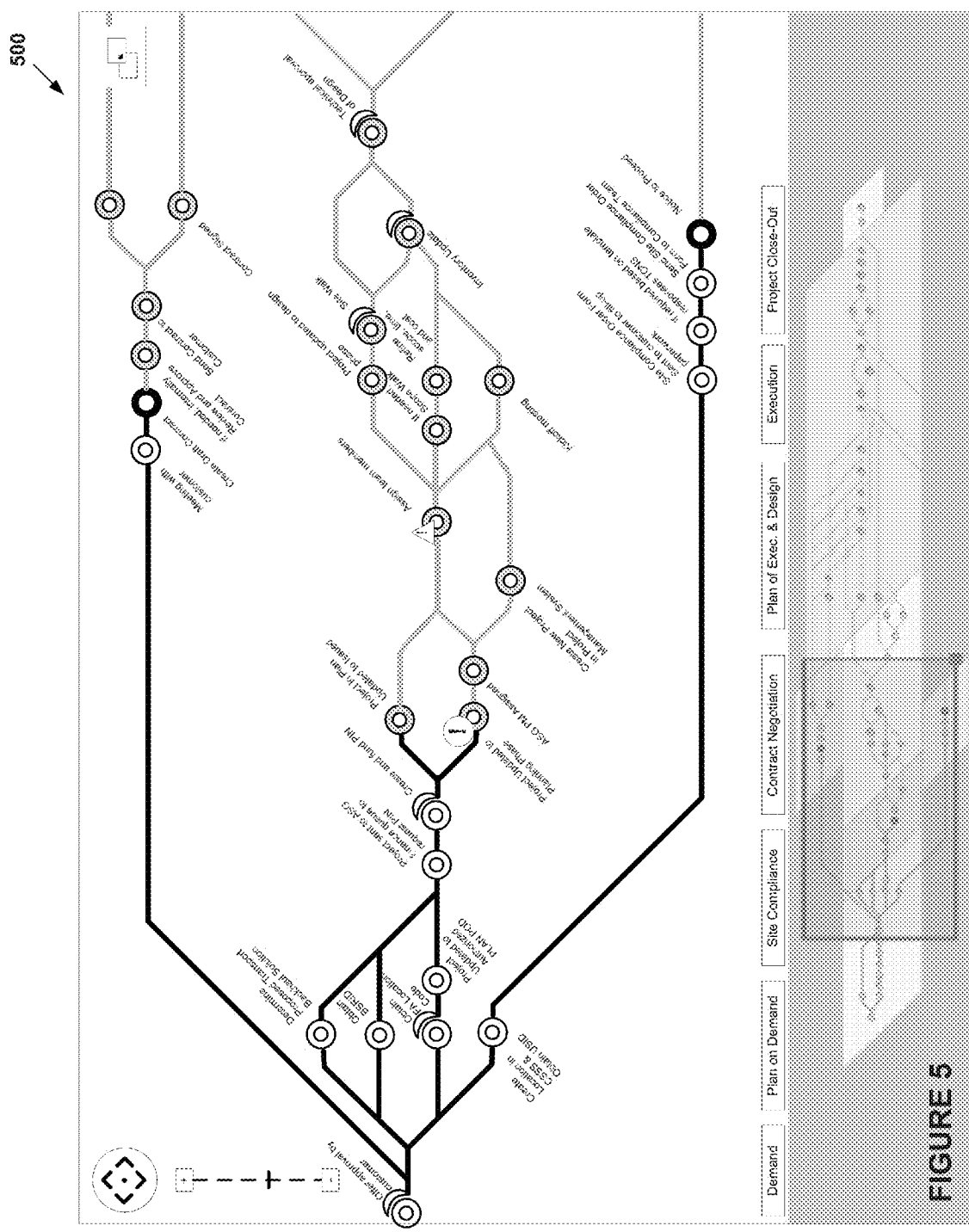
FIG. 5 illustrates a plan view, in accordance with one embodiment.

FIG. 5 illustrates a plan view 500, in accordance with one embodiment. As an option, the plan view 500 may be implemented in the context of the details of the previous figures. Of course, however, the plan view 500 may be implemented in the context of any desired environment. Further, the aforementioned definitions may equally apply to the description below.

In one embodiment, the plan view may represent the main element of visibility. The plan view may show a number of aspects within one diagram, with a high level view, and the entire plan being zoom-able, scrollable and searchable. Thus, the plan view may function to provide a unique and innovative way to see the visibility of the plan. The plan view may be available on both desktop and mobile devices from the same application.

In one embodiment, stages of a plan may be denoted by shaded background areas, overlaid with grouping of plan building blocks denoted by a 'double donut' symbol and discrete activities denoted by 'single donut' symbol.

In one embodiment, all donut symbols may give status through color, which may change as the plan executes. Furthermore, an indicator may show whether the item needs to be urgently addressed. For example, by clicking on any of the double donut symbols, further detail may be seen by way of more detailed levels of the plan, or in the case of a single donut symbol, individual summary including dates, details, and actions of an activity may be provided.

As an option, if the structure of the plan changes, then a single donut symbol may dynamically change into a double donut where further levels of detail are added. The plan view may address increasing levels of complexity while still maintaining a clean and intuitive view.

Furthermore, the plan view may deal with multiple patterns regarding how operators build their networks using best practices, including, but not limited to, access options, aggregation options, venue specific options, vendor specific options, and/or service specific options. Within one project there may be multiple instances of these options from within one place on the plan or across different plans.

Figure 6:
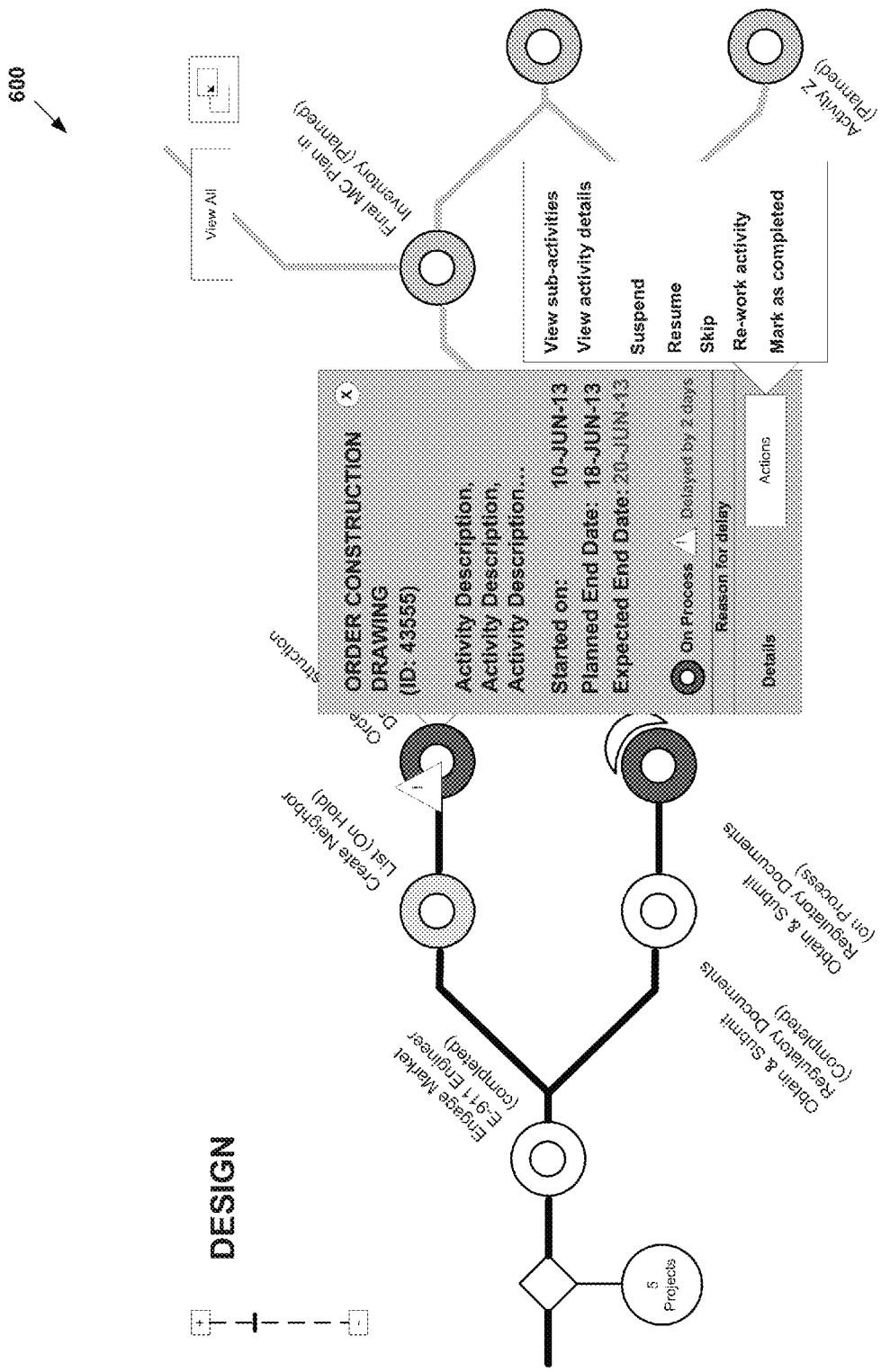
FIG. 6 illustrates a plan view showing drill-down detail associated with an activity, in accordance with one embodiment.

FIG. 6 illustrates a plan view 600 showing drill-down detail associated with an activity, in accordance with one embodiment. As an option, the plan view 600 may be implemented in the context of the details of the previous figures. Of course, however, the plan view 600 may be implemented in the context of any desired environment. Further, the aforementioned definitions may equally apply to the description below.

In various embodiments, the plan view may present many plans in one view, providing support for one plan, a parent plan with multiple sub-plans, a parent plan with multiple sub-plans running on different engines, peer to peer (e.g. siblings), multiple instances of the same sub-plan, and/or multiple instances of the peer to peer relationships. Further, in one embodiment, the plan view may indicate milestones associated with a project.

Figure 7:
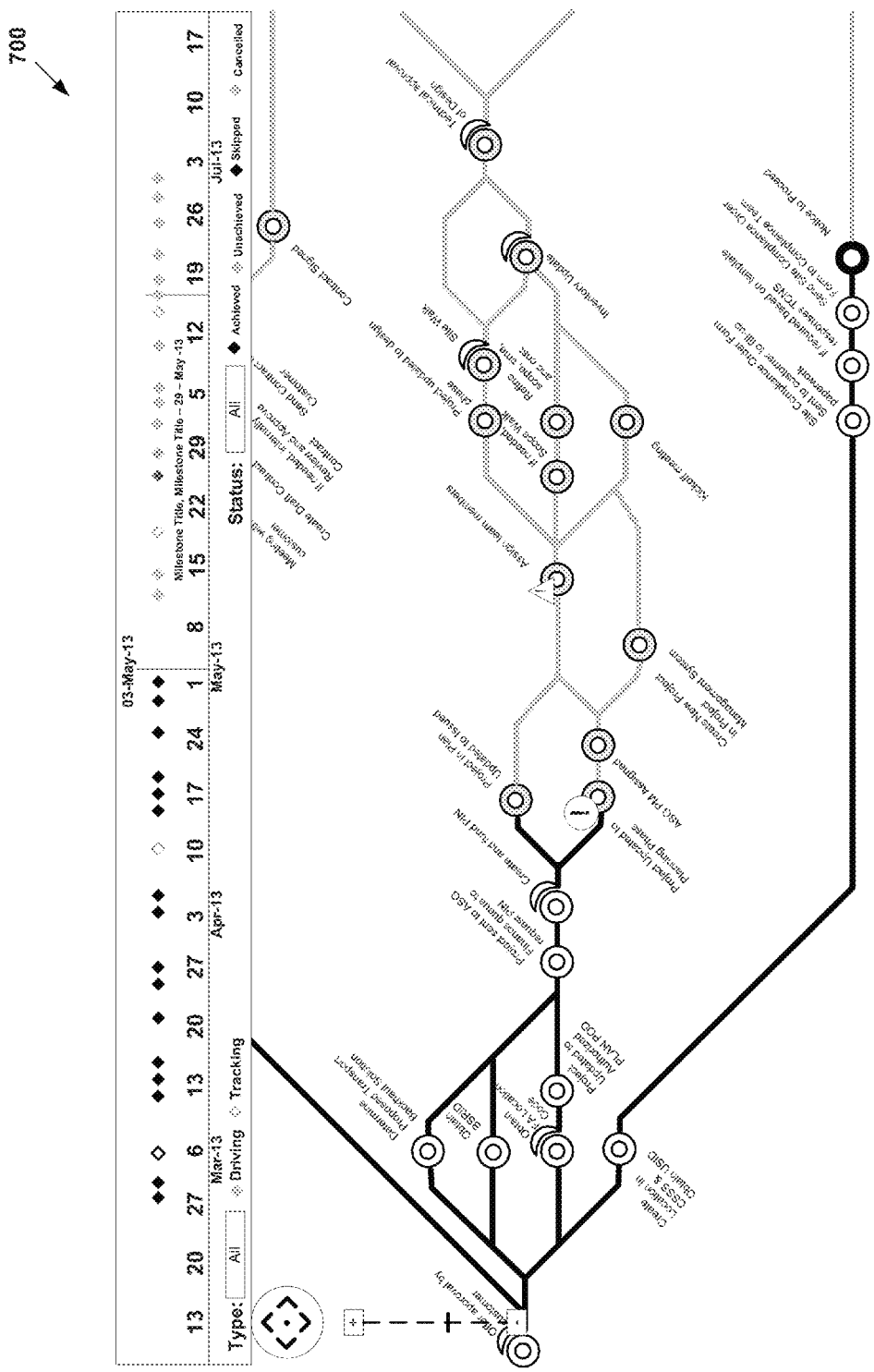
FIG. 7 illustrates a milestone view, in accordance with one embodiment.

FIG. 7 illustrates a milestone view 700, in accordance with one embodiment. As an option, the milestone view 700 may be implemented in the context of the details of the previous figures. Of course, however, the milestone view 700 may be implemented in the context of any desired environment. Further, the aforementioned definitions may equally apply to the description below.

As shown, the milestone view may combine the plan view with a timeline of key points in the plan (i.e. milestones). In one embodiment, the milestone view may use colors and filtering to allow simplification of the view and offer the ability to focus on a particular milestone too view related activities.

A milestone is a common way of indicating the completion of a work package or phase. In a heterogeneous environment, some systems that are involved in the execution of the project drive the achievement of a given milestone. However, not every milestone is a direct result of the execution. In this complex environment, external events could cause the achievement of a given milestone.

The visibility model provides a scheme for both driving and tracking milestones and a way to associate them to any of the activities with the plans in the model. In one embodiment, a service level management module may be configured with escalation thresholds for each milestone which when triggered are placed back into the visibility model to be used by its clients.

Different clients may access the visibility model to get a complete picture for a plan view. However, if a finer grained view of change within the model is required, in one embodiment, a configurable notification scheme may be implemented, which may include sending notifications associated with each activity status, escalation, milestone or timeline change within a given project modeled.

In one embodiment, the visibility model may include a summary view and/or a timeline view.

Figure 8:
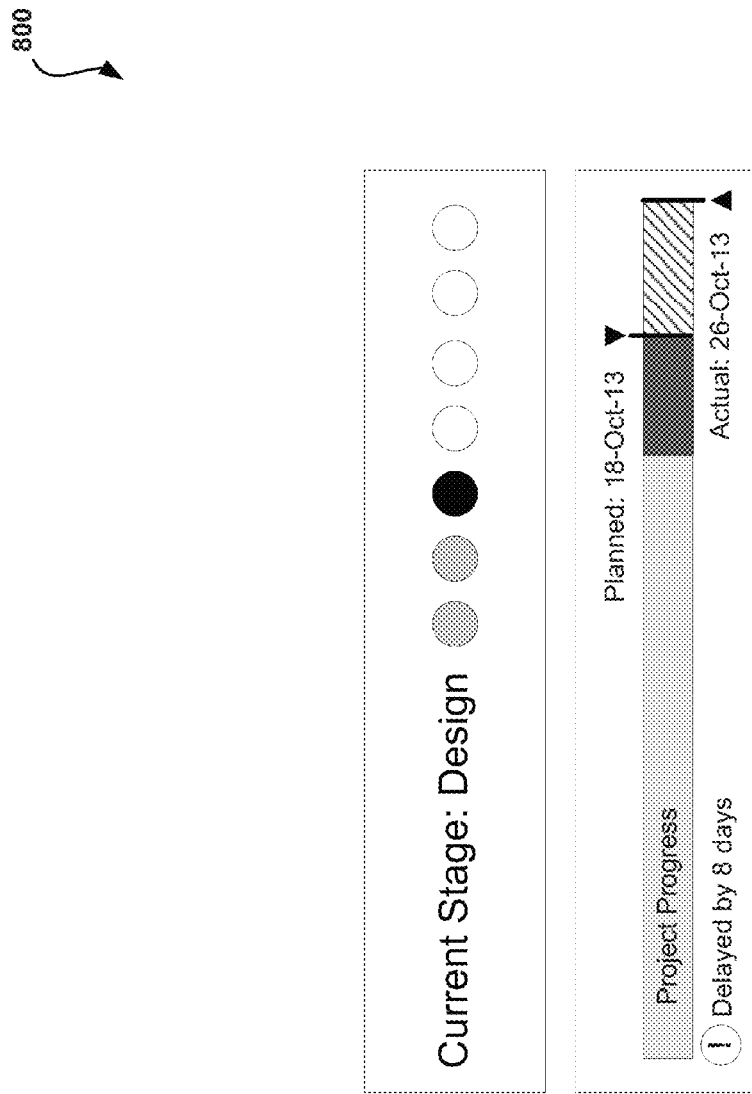
FIG. 8 illustrates a summary/timeline view, in accordance with one embodiment.

FIG. 8 illustrates a summary/timeline view 800, in accordance with one embodiment. As an option, the summary/timeline view 800 may be implemented in the context of the details of the previous figures. Of course, however, the summary/timeline view 800 may be implemented in the context of any desired environment. Further, the aforementioned definitions may equally apply to the description below.

In one embodiment, a summary view may be provided including a view of the stages of a project and an indication of whether these stages have started and/or completed. Furthermore, a timeline view may be provided indicating the overall project timeline and the progress that has been made.

The visibility model may allow for the tracking of the entire timeline across multiple sub-plans, delays, supplements, and rework. The visibility model may provide a view indicating how far along the project is and whether the project is on track from a time perspective.

Utilizing the techniques described herein, an independent technique to provide visibility in a heterogeneous environment and to maintain a consistent way to monitor service level agreements across a visibility model may be implemented. This capability may be deployed as a service used by many systems and clients from which to publish and present.

Figure 9:
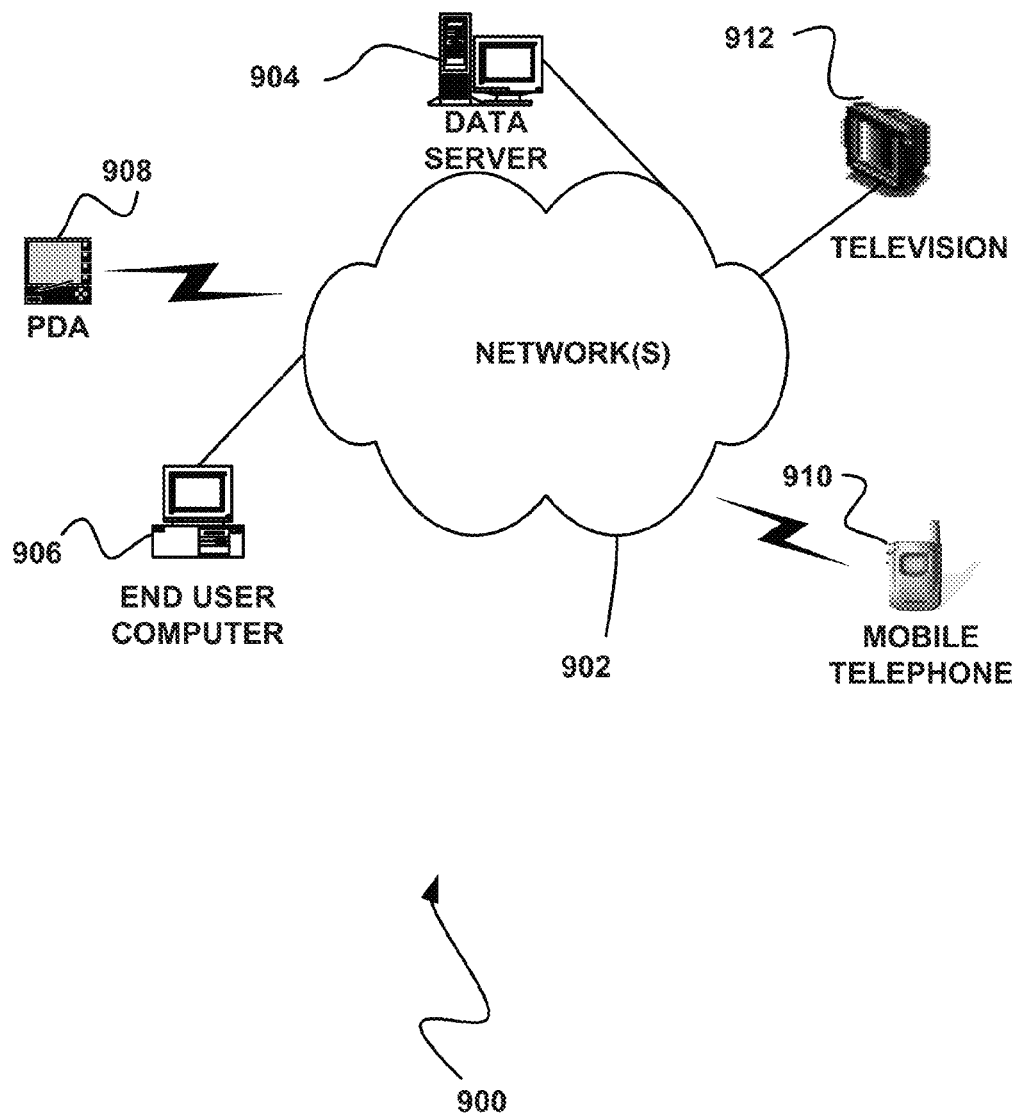
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
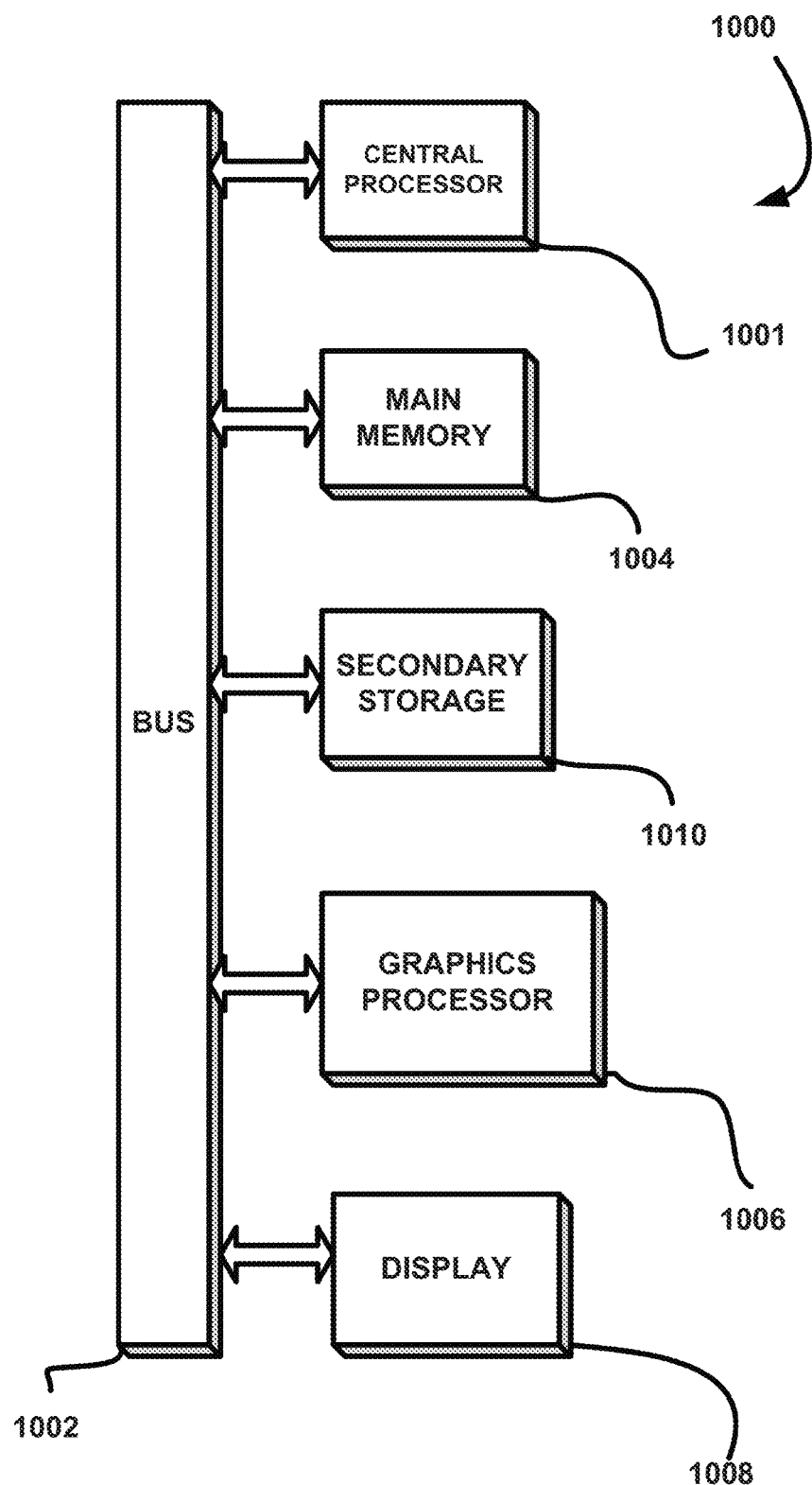
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    computer code for identifying, by a visibility model generation hardware system, a plurality of disparate systems associated with a project, the visibility model generation hardware system being separate from the plurality of disparate systems and the project being a network rollout plan for a communication service provider (CSP) and the plurality of disparate systems contributing to execution of the project;
    computer code for receiving, by the visibility model generation hardware system, information associated with the project from the plurality of systems during execution of the plan, the information corresponding to a status of discrete activities associated with the project;
    computer code for organizing, by the visibility model generation hardware system, the received information corresponding to the discrete activities according to stages of the project;
    computer code for generating, by the visibility model generation hardware system, a visibility model associated with the project utilizing the organized discrete activities, the visibility model presenting a graphical representation of a plan associated with the project and the plan having:
        parent plan nodes each representing a different one of the stages of the project,
        the discrete activities indicated in the parent plan nodes based on the organization of the discrete activities according to the stages of the project, and
        an indication of the status of each of the discrete activities, wherein the status of each of the discrete activities is selected from the group consisting of: not yet started, started, and completed, and wherein the status of each of the discrete activities further includes an indication of a number of times that the discrete activity has been re-executed;
    computer code for making the visibility model accessible, through one or more web services, to client devices for viewing by users;
    acting, by a service level management module associated with the visibility model generation hardware system, on the start and completion statuses of each of the discrete activities to monitor an actual duration against an expected duration, wherein the service level management module is configured with escalation thresholds which when triggered are placed back into the visibility model to be used by the client devices, and wherein the service level management module resets the monitoring so that the escalation thresholds can be independently triggered for each re-execution;
    computer code for receiving, by the visibility model generation hardware system, first updated information associated with the project from a first one of the plurality of disparate systems, the first updated information being an update to the status of at least one of the discrete activities;
    computer code for receiving, by the visibility model generation hardware system, second updated information associated with the project from a second one of the plurality of disparate systems, the second updated information being one or more new activities included in a sub-stage of one of the stages of the project;
    computer code for updating, by the visibility model generation hardware system, the visibility model associated with the project utilizing the first updated information and the second updated information by:
        updating the indication of the status of the at least one of the discrete activities included in the visibility model based on the first updated information, and
        adding the sub-stage of the one of the stages of the project including the one or more new activities as a sub-plan to one of the parent plan nodes representing the one of the stages of the project; and
    computer code for making the updated visibility model accessible, through the one or more web services, to the client devices for viewing by the users.

2. The computer program product of claim 1, wherein the computer program product is operable such that the visibility model is capable of modeling arbitrary dependencies.

3. The computer program product of claim 1, wherein the computer program product is operable such that the visibility model is searchable.

4. The computer program product of claim 3, wherein the computer program product is operable such that the visibility model includes a presentable timeline of key points associated with the project.

5. A method, comprising:
    identifying, by a visibility model generation hardware system, a plurality of disparate systems associated with a project, the visibility model generation hardware system being separate from the plurality of disparate systems and the project being a network rollout plan for a communication service provider (CSP) and the plurality of disparate systems contributing to execution of the project;

receiving, by the visibility model generation hardware system, information associated with the project from the plurality of systems during execution of the plan, the information corresponding to a status of discrete activities associated with the project;

organizing, by the visibility model generation hardware system, the received information corresponding to the discrete activities according to stages of the project;

generating, by the visibility model generation hardware system, a visibility model associated with the project utilizing the organized discrete activities, the visibility model presenting a graphical representation of a plan associated with the project and the plan having:

- parent plan nodes each representing a different one of the stages of the project,
- the discrete activities indicated in the parent plan nodes based on the organization of the discrete activities according to the stages of the project, and
- an indication of the status of each of the discrete activities, wherein the status of each of the discrete activities is selected from the group consisting of: not yet started, started, and completed, and wherein the status of each of the discrete activities further includes an indication of a number of times that the discrete activity has been re-executed;
- making the visibility model accessible, through one or more web services, to client devices for viewing by users;
- acting, by a service level management module associated with the visibility model generation hardware system, on the start and completion statuses of each of the discrete activities to monitor an actual duration against an expected duration, wherein the service level management module is configured with escalation thresholds which when triggered are placed back into the visibility model to be used by the client devices, and wherein the service level management module resets the monitoring so that the escalation thresholds can be independently triggered for each re-execution:

receiving, by the visibility model generation hardware system, first updated information associated with the project from a first one of the plurality of disparate systems, the first updated information being an update to the status of at least one of the discrete activities;

receiving, by the visibility model generation hardware system, second updated information associated with the project from a second one of the plurality of disparate systems, the second updated information being one or more new activities included in a sub-stage of one of the stages of the project;

updating, by the visibility model generation hardware system, the visibility model associated with the project utilizing the first updated information and the second updated information by:

- updating the indication of the status of the at least one of the discrete activities included in the visibility model based on the first updated information, and
- adding the sub-stage of the one of the stages of the project including the one or more new activities as a sub-plan to one of the parent plan nodes representing the one of the stages of the project; and making the updated visibility model accessible, through the one or more web services, to the client devices for viewing by the users.

6. A system comprising:

a memory system of a visibility model generation hardware system; and one or more processing cores of the visibility model generation hardware system that are coupled to the memory system and that are each configured to:

identify a plurality of disparate systems associated with a project, the visibility model generation hardware system being separate from the plurality of disparate systems and the project being a network rollout plan for a communication service provider (CSP) and the plurality of disparate systems contributing to execution of the project;

receive information associated with the project from the plurality of systems during execution of the plan, the information corresponding to a status of discrete activities associated with the project;

organize the received information corresponding to the discrete activities according to stages of the project;

generate a visibility model associated with the project utilizing the organized discrete activities, the visibility model presenting a graphical representation of a plan associated with the project and the plan having:

- parent plan nodes each representing a different one of the stages of the project,
- the discrete activities indicated in the parent plan nodes based on the organization of the discrete activities according to the stages of the project, and
- an indication of the status of each of the discrete activities, wherein the status of each of the discrete activities is selected from the group consisting of: not yet started, started, and completed, and wherein the status of each of the discrete activities further includes an indication of a number of times that the discrete activity has been re-executed;

make the visibility model accessible, through one or more web services, to client devices for viewing by users;

act on the start and completion statuses of each of the discrete activities to monitor an actual duration against an expected duration, wherein escalation thresholds, when triggered, are placed back into the visibility model to be used by the client devices, and wherein the monitoring is reset so that the escalation thresholds can be independently triggered for each re-execution;

receive first updated information associated with the project from a first one of the plurality of disparate systems, the first updated information being an update to the status of at least one of the discrete activities;

receive second updated information associated with the project from a second one of the plurality of disparate systems, the second updated information being one or more new activities included in a sub-stage of one of the stages of the project;

update the visibility model associated with the project utilizing the first updated information and the second updated information by:

- updating the indication of the status of the at least one of the discrete activities included in the visibility model based on the first updated information, and
- adding the sub-stage of the one of the stages of the project including the one or more new activities as a sub-plan to one of the parent plan nodes representing the one of the stages of the project; and make the updated visibility model accessible, through the one or more web services, to the client devices for viewing by the users.

\* \* \* \* \*